(12) United States Patent
Blenke et al.

(10) Patent No.: US 7,955,710 B2
(45) Date of Patent: *Jun. 7, 2011

(54) ULTRASONIC BONDING OF DISSIMILAR MATERIALS

(75) Inventors: Timothy J. Blenke, Neenah, WI (US); Peiguang Zhou, Appleton, WI (US); Thomas D. Ehlert, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1075 days.

This patent is subject to a terminal disclaimer.

(21) Appl. No.: 10/743,222

(22) Filed: Dec. 22, 2003

(65) Prior Publication Data

US 2005/0133146 A1   Jun. 23, 2005

(51) Int. Cl.
  *B32B 27/08* (2006.01)
  *C08L 23/00* (2006.01)
(52) U.S. Cl. ............... 428/500; 428/516; 525/240
(58) Field of Classification Search ........... 428/500, 428/515, 516, 523, 507–513; 525/240; 264/73, 264/1

See application file for complete search history.

(56) References Cited

U.S. PATENT DOCUMENTS

| | | |
|---|---|---|
| 3,325,562 A | 6/1967 | Peterkin |
| 3,338,992 A | 8/1967 | Kinney |
| 3,341,394 A | 9/1967 | Kinney |
| 3,370,106 A | 2/1968 | Hall, Jr. et al. |
| 3,492,372 A | 1/1970 | Flanagan |
| 3,502,538 A | 3/1970 | Petersen |
| 3,502,763 A | 3/1970 | Hartmann |
| 3,542,615 A | 11/1970 | Dobo et al. |
| 3,634,546 A | 1/1972 | Hagemeyer |
| 3,635,861 A | 1/1972 | Russell |
| 3,686,107 A | 8/1972 | Russell |
| 3,692,618 A | 9/1972 | Dorschner et al. |
| 3,717,601 A | 2/1973 | Jurrens |
| 3,802,817 A | 4/1974 | Matsuki et al. |
| 3,849,241 A | 11/1974 | Butin et al. |
| 3,850,858 A | 11/1974 | Park |
| 3,862,068 A | 1/1975 | Russell |
| 3,887,442 A | 6/1975 | Gilchrist |
| 3,900,694 A | 8/1975 | Jurrens |
| 3,909,009 A | 9/1975 | Cvetko et al. |
| 3,982,051 A | 9/1976 | Taft et al. |
| 4,013,816 A | 3/1977 | Sabee et al. |
| 4,022,728 A | 5/1977 | Trotter et al. |
| 4,041,203 A | 8/1977 | Brock et al. |
| 4,072,735 A | 2/1978 | Ardemagni |
| 4,077,410 A | 3/1978 | Butterworth et al. |
| 4,112,208 A | 9/1978 | McConnell et al. |
| 4,120,916 A | 10/1978 | Meyer, Jr. et al. |
| 4,143,858 A | 3/1979 | Schmidt, III et al. |
| 4,178,272 A | 12/1979 | Meyer, Jr. et al. |
| 4,186,258 A | 1/1980 | Schmidt, III et al. |
| 4,221,696 A | 9/1980 | Cook et al. |
| 4,259,220 A | 3/1981 | Bunnelle et al. |
| 4,296,750 A | 10/1981 | Woon et al. |
| 4,300,967 A | 11/1981 | Sigl |
| 4,340,563 A | 7/1982 | Appel et al. |
| 4,366,292 A | 12/1982 | Werner et al. |
| 4,437,860 A | 3/1984 | Sigl et al. |
| 4,460,728 A | 7/1984 | Schmidt, Jr. et al. |
| 4,486,192 A | 12/1984 | Sigl |
| 4,493,868 A | 1/1985 | Meitner |
| 4,554,304 A | 11/1985 | Hansen et al. |
| 4,568,713 A | 2/1986 | Hansen et al. |
| 4,573,991 A | 3/1986 | Pieniak et al. |
| 4,610,681 A | 9/1986 | Strohbeen et al. |
| 4,641,381 A | 2/1987 | Heran et al. |
| 4,650,481 A | 3/1987 | O'Conner et al. |
| 4,654,040 A | 3/1987 | Luceri |
| 4,668,230 A | 5/1987 | Damico et al. |
| 4,713,068 A | 12/1987 | Wang et al. |
| 4,719,261 A | 1/1988 | Bunnelle et al. |
| 4,761,450 A | 8/1988 | Lakshmanan et al. |
| 4,762,520 A | 8/1988 | Wallstrom |
| 4,774,292 A | 9/1988 | Thiersault et al. |
| 4,784,892 A | 11/1988 | Storey et al. |
| 4,798,603 A | 1/1989 | Meyer et al. |
| 4,823,783 A | 4/1989 | Willhite, Jr. et al. |
| 4,824,889 A | 4/1989 | Mostert |
| 4,826,909 A | 5/1989 | Lakshmanan et al. |
| 4,833,192 A | 5/1989 | Lakshmanan et al. |
| 4,857,594 A | 8/1989 | Lakshmanan et al. |
| 4,881,683 A | 11/1989 | Linnemann |
| 4,937,138 A | 6/1990 | Mostert |
| 4,939,202 A | 7/1990 | Maletsky et al. |

(Continued)

FOREIGN PATENT DOCUMENTS

CA    0803714    1/1969

(Continued)

OTHER PUBLICATIONS

International Search report from PCT/US2004/033454 dated Feb. 17, 2005.

(Continued)

*Primary Examiner* — Kevin R. Kruer
(74) *Attorney, Agent, or Firm* — Armstrong Teasdale LLP

(57) ABSTRACT

Ultrasonically bonded laminated absorbent products comprising a first substrate, a second substrate, and an adhesive composition are disclosed. The first and second substrates are dissimilar or non-bondable materials. The adhesive composition comprises a mixture of atactic and isotactic polymers such that it has melt and flow characteristics similar to those of the materials.

26 Claims, No Drawings

U.S. PATENT DOCUMENTS

| | | | |
|---|---|---|---|
| 4,940,464 A | 7/1990 | Van Gompel et al. | |
| 4,949,668 A | 8/1990 | Heindel et al. | |
| 4,998,928 A | 3/1991 | Maletsky et al. | |
| 5,026,752 A | 6/1991 | Wakabayashi et al. | |
| 5,096,532 A | 3/1992 | Neuwirth et al. | |
| 5,110,403 A | 5/1992 | Ehlert | |
| 5,171,239 A | 12/1992 | Igaue et al. | |
| 5,176,668 A * | 1/1993 | Bernardin | 604/368 |
| 5,176,672 A | 1/1993 | Bruemmer et al. | |
| 5,192,606 A | 3/1993 | Proxmire et al. | |
| 5,211,792 A | 5/1993 | Carter | |
| 5,213,881 A | 5/1993 | Timmons et al. | |
| 5,219,633 A | 6/1993 | Sabee | |
| 5,234,422 A | 8/1993 | Sneller et al. | |
| 5,334,446 A | 8/1994 | Quantrille et al. | |
| 5,336,545 A | 8/1994 | Morman | |
| 5,344,691 A | 9/1994 | Hanschen et al. | |
| 5,397,846 A | 3/1995 | Eichhorn et al. | |
| 5,434,004 A | 7/1995 | Ajioka et al. | |
| 5,468,320 A | 11/1995 | Zafiroglu | |
| 5,468,428 A | 11/1995 | Hanschen et al. | |
| 5,472,792 A | 12/1995 | Tsurutani et al. | |
| 5,478,891 A | 12/1995 | Lakshmanan et al. | |
| 5,482,761 A | 1/1996 | Palumbo et al. | |
| 5,498,463 A | 3/1996 | McDowall et al. | |
| 5,503,076 A | 4/1996 | Yeo | |
| 5,512,625 A | 4/1996 | Butterbach et al. | |
| 5,516,572 A | 5/1996 | Roe | |
| 5,516,848 A | 5/1996 | Canich et al. | |
| 5,530,054 A | 6/1996 | Tse et al. | |
| 5,536,563 A | 7/1996 | Shah et al. | |
| 5,539,056 A | 7/1996 | Yang et al. | |
| 5,548,014 A | 8/1996 | Tse et al. | |
| 5,596,042 A | 1/1997 | Itoh et al. | |
| 5,643,240 A | 7/1997 | Jackson et al. | |
| 5,667,608 A | 9/1997 | Rajala et al. | |
| 5,670,580 A | 9/1997 | Tazaki et al. | |
| 5,688,259 A | 11/1997 | Osborn, III et al. | |
| 5,705,011 A | 1/1998 | Bodford et al. | |
| 5,723,546 A | 3/1998 | Sustic | |
| 5,763,534 A | 6/1998 | Srinivasan et al. | |
| 5,773,515 A | 6/1998 | Srinivasan et al. | |
| 5,785,697 A | 7/1998 | Trombetta et al. | |
| 5,786,418 A | 7/1998 | Strelow et al. | |
| 5,795,344 A | 8/1998 | Chappell | |
| 5,822,884 A | 10/1998 | Roeder | |
| 5,827,254 A | 10/1998 | Trombetta et al. | |
| 5,834,385 A | 11/1998 | Blaney et al. | |
| 5,843,267 A | 12/1998 | Cashaw et al. | |
| 5,849,003 A | 12/1998 | Olsen et al. | |
| 5,882,769 A | 3/1999 | McCormack et al. | |
| 5,888,604 A | 3/1999 | Evans, Jr. et al. | |
| 5,902,297 A | 5/1999 | Sauer | |
| 5,904,672 A * | 5/1999 | LeMahieu et al. | 604/378 |
| 5,904,675 A | 5/1999 | Laux et al. | |
| 5,939,483 A | 8/1999 | Kueppers | |
| 5,947,949 A | 9/1999 | Inoue et al. | |
| 5,985,971 A | 11/1999 | Srinivasan et al. | |
| 5,994,614 A | 11/1999 | Wada et al. | |
| 5,998,524 A | 12/1999 | Srinivasan et al. | |
| 6,008,148 A | 12/1999 | Harris et al. | |
| 6,020,535 A | 2/2000 | Blenke et al. | |
| 6,024,822 A | 2/2000 | Alper et al. | |
| 6,034,159 A | 3/2000 | Malcolm | |
| 6,045,895 A | 4/2000 | Hyde et al. | |
| 6,080,818 A | 6/2000 | Thakker et al. | |
| 6,087,550 A | 7/2000 | Anderson-Fisher et al. | |
| 6,114,261 A | 9/2000 | Strelow et al. | |
| 6,140,551 A | 10/2000 | Niemeyer et al. | |
| 6,143,818 A | 11/2000 | Wang et al. | |
| 6,177,605 B1 | 1/2001 | Trombetta et al. | |
| 6,184,294 B1 | 2/2001 | Park et al. | |
| 6,207,748 B1 | 3/2001 | Tse et al. | |
| 6,211,272 B1 | 4/2001 | Shafer et al. | |
| 6,218,457 B1 | 4/2001 | Fralich et al. | |
| 6,231,555 B1 | 5/2001 | Lynard et al. | |
| 6,235,356 B1 | 5/2001 | Shibuya et al. | |
| 6,239,047 B1 | 5/2001 | Erdos et al. | |
| 6,248,832 B1 | 6/2001 | Peacock | |
| 6,248,834 B1 | 6/2001 | Mori | |
| 6,276,032 B1 | 8/2001 | Nortman et al. | |
| 6,284,943 B1 | 9/2001 | Osborn, III et al. | |
| 6,288,171 B2 | 9/2001 | Finerman et al. | |
| 6,329,468 B1 | 12/2001 | Wang | |
| 6,428,525 B1 | 8/2002 | Malowaniec | |
| 6,436,083 B1 | 8/2002 | Mishima et al. | |
| 6,443,936 B1 | 9/2002 | Hamilton et al. | |
| 6,452,063 B1 | 9/2002 | Curro et al. | |
| 6,482,192 B2 | 11/2002 | Haarer et al. | |
| 6,572,596 B2 | 6/2003 | Pargass et al. | |
| 6,610,904 B1 | 8/2003 | Thomas et al. | |
| 6,639,020 B1 | 10/2003 | Brant | |
| 6,747,114 B2 | 6/2004 | Karandinos et al. | |
| 6,774,069 B2 * | 8/2004 | Zhou et al. | 442/328 |
| 6,835,678 B2 | 12/2004 | Jackson et al. | |
| 6,887,941 B2 * | 5/2005 | Zhou | 525/191 |
| 6,890,630 B2 | 5/2005 | Franklin et al. | |
| 7,396,782 B2 | 7/2008 | Blenke et al. | |
| 2001/0010990 A1 | 8/2001 | Erdos et al. | |
| 2002/0010265 A1 | 1/2002 | Johnson et al. | |
| 2002/0019187 A1 | 2/2002 | Carroll et al. | |
| 2002/0039637 A1 | 4/2002 | Meece et al. | |
| 2002/0064639 A1 | 5/2002 | Rearick et al. | |
| 2002/0098353 A1 | 7/2002 | Kollaja et al. | |
| 2002/0122953 A1 | 9/2002 | Zhou | |
| 2002/0123538 A1 * | 9/2002 | Zhou et al. | 523/176 |
| 2002/0123726 A1 | 9/2002 | Zhou et al. | |
| 2002/0124956 A1 | 9/2002 | Zhou | |
| 2002/0177376 A1 | 11/2002 | Welch et al. | |
| 2003/0092792 A1 | 5/2003 | Blenke et al. | |
| 2004/0127123 A1 | 7/2004 | Jordan et al. | |

FOREIGN PATENT DOCUMENTS

| | | |
|---|---|---|
| CA | 2056812 A | 3/1993 |
| DE | 69404495 T2 | 1/1998 |
| DE | 69225749 T2 | 10/1998 |
| EP | 0205242 B2 | 4/1986 |
| EP | 0217032 | 4/1987 |
| EP | 0285430 A2 | 3/1988 |
| EP | 0315013 A2 | 5/1989 |
| EP | 0758675 A2 | 2/1997 |
| EP | 0611801 B1 | 7/1997 |
| EP | 0527589 B1 | 6/1998 |
| EP | 1039007 A1 | 8/1999 |
| EP | 1050612 A1 | 5/2000 |
| GB | 1159601 A | 7/1969 |
| JP | 62-081470 | 10/1985 |
| JP | 63303109 | 5/1987 |
| JP | 01111016 | 10/1987 |
| JP | 10086256 | 9/1996 |
| JP | 10168726 | 12/1996 |
| JP | 11290381 | 4/1998 |
| JP | 2000314068 | 5/1999 |
| WO | WO 86/07242 A1 | 12/1986 |
| WO | WO 89/05334 | 6/1989 |
| WO | WO 91/18573 | 12/1991 |
| WO | WO 96/06966 A1 | 3/1996 |
| WO | WO 98/37144 | 8/1998 |
| WO | WO 99/14039 A1 | 3/1999 |
| WO | WO 99/25296 | 5/1999 |
| WO | WO 00/37723 A2 | 6/2000 |
| WO | WO 00/44412 A1 | 8/2000 |
| WO | WO 01/15646 A1 | 3/2001 |
| WO | WO 01/49913 A1 | 7/2001 |
| WO | WO 02/22344 A1 | 3/2002 |
| WO | WO 02/085273 A1 | 10/2002 |

OTHER PUBLICATIONS

International Search report from PCT/US2004/038341 dated Feb. 17, 2005.

International Search Report from PCT/US2004/033461 dated Feb. 14, 2005.

Joseph, Marjory L., Introductory Textile Science 1986, p. 1, Holt, Rinehart and Winston, New York.

PCT/US01/48372 PCT International Written Opinion dated Aug. 30, 2006.

Nonfinal Office action from U.S. Appl. No. 11/550,595, dated Nov. 27, 2007 (16 pages).
Final Office action regarding U.S. Appl. No. 12/211,744, dated Mar. 9, 2010.
Non-final Office Action regarding U.S. Appl. No. 10/744,332, dated Dec. 26, 2008.
Office action from U.S. Appl. No. 11/550,595, dated Feb. 3, 2009.
Non-final Office Action in U.S. Appl. No. 11/958,237 mailed Apr. 29, 2009.
Office Action issued in German Patent Application No. 10197127.3 on Mar. 17, 2010.
Non-final Office action issued in U.S. Appl. No. 11/959,284, dated Apr. 23, 2009.
Final Office Action regarding U.S. Appl. No. 10/744,332, dated Mar. 24, 2010.
Final Office action regarding U.S. Appl. No. 10/744,332, dated Jun. 22, 2009.
Final Office action regarding U.S. Appl. No. 11/958,237, dated Jun. 25, 2010.
Communication pursuant to Article 94(3) EPC for European Application No. EP 04794725.4, dated Jun. 8, 2010.
Non-final Office action regarding U.S. Appl. No. 12/128,429, dated Jul. 28, 2010.
Non-final Office action regarding U.S. Appl. No. 12/211,744, dated Aug. 17, 2009.
Non-final Office action regarding U.S. Appl. No. 10/744,332, dated Sep. 16, 2009.
Non-final Office Action regarding U.S. Appl. No. 11/958,237, dated Sep. 18, 2009.
"Tacticity" from Wikipedia, the free encyclopedia.
Final Office Action regarding U.S. Appl. No. 11/959,284, dated Sep. 22, 2009.
US 5,915,536, 06/1999, Alberts et al. (withdrawn)

* cited by examiner

ULTRASONIC BONDING OF DISSIMILAR MATERIALS

BACKGROUND OF THE INVENTION

The present invention is directed to laminated products such as diapers, incontinence garments, surgical gowns, face masks, and the like. Specifically, the present invention is directed to laminated products which comprise a first substrate, a second substrate, and an adhesive composition. The first and second substrates are dissimilar materials or materials that are non-ultrasonically bondable using conventional means. The adhesive composition comprises a specific mixture of atactic and isotactic polymers such that it allows for and aids in the ultrasonic bonding of dissimilar materials or non-bondable materials.

People rely on disposable absorbent articles to make their lives easier. Disposable absorbent articles, such as adult incontinence garments and diapers, are generally manufactured by combining several components. These components typically include a liquid-permeable topsheet, a liquid-impermeable backsheet attached to the topsheet, and an absorbent core located between the topsheet and the backsheet. When the disposable article is worn, the liquid-permeable topsheet is positioned next to the body of the wearer. The topsheet allows passage of bodily fluids into the absorbent core. The liquid-impermeable backsheet helps prevent leakage of fluids held in the absorbent core. The absorbent core generally is designed to have desirable physical properties, such as, for example, a high absorbent capacity and high absorption rate, so that bodily fluids can be transported from the skin of the wearer into the disposable absorbent article.

Frequently, one or more components of a disposable absorbent article are first adhesively, and then ultrasonically bonded together to ensure adequate strength of the resulting bond. For example, conventional hot melt adhesives have been used to first bond individual layers of the absorbent article, such as the topsheet (also known as, for example, the body-side liner) and backsheet (also known as, for example, the outer cover), together. Conventional hot melt adhesives have also been used to bond discrete pieces, such as fasteners and leg elastics, to the article. In many cases, the bonding together of two components (whether for a permanent-type bond or simply for holding components in place during the manufacturing process) forms a laminated structure in which adhesive is sandwiched between materials (such as layers of polymer film and/or layers of woven or nonwoven fabrics) that make up the components being bonded together. Once the laminated structure is formed, the laminate will typically undergo an ultrasonic bonding process to impart increased strength in the bonded area of the laminate.

Conventional hot melt adhesives generally utilized in adhesive bonding of materials in laminated absorbent products generally comprise several components including: (1) one or more polymers to provide cohesive strength; (2) a resin or analogous material to provide adhesive strength; (3) waxes, plasticizers, or other materials to modify viscosity; and (4) other additives such as antioxidants and stabilizers. Conventional hot melt adhesives are well known in the industry to those skilled in the art.

Ultrasonic bonding is a conventional bonding technique wherein materials are exposed to a high frequency vibration which results in a heating, melting, and flowing of the polymeric materials into each other to form a mechanical and/or chemical bond. Although commonly utilized in the production of laminated absorbent articles, ultrasonic bonding can become problematic when dissimilar or non-bondable materials are utilized. That is, the ultrasonic bonding of polymer based films or non-woven materials that have melting points that vary greatly from each other can be very difficult, or even impossible to accomplish as a polymer with a lower melt temperature that will soften and dissipate away from the bonding zone before the polymer material with the higher melting point will soften. Additionally, the ultrasonic bonding of non-thermoplastic materials, such as the ultrasonic bonding of two cellulosic materials (e.g., tissues) together, is also very difficult, if not impossible as the materials do not melt and flow together. Although it may be possible to achieve some ultrasonic bonding in these situations, any resulting bond is typically weak and unreliable.

Further, ultrasonic bonding of dissimilar or non-bondable materials can become problematic in the presence of conventional hot melt adhesive materials. For example, during ultrasonic bonding, the adhesive composition can result in bleedthrough of the adhesive through one or both of the materials. This bleedthrough can result in at least three significant problems. First, such bleedthrough can result in a discolored end product. Such discoloration, although typically not affecting product performance, is not desirable for consumers who prefer white, uncolored, clean-looking products. Second, the bleedthrough on the end product can result in a tacky product which sticks to skin upon use, which is not desirable for consumers. Third, the bleedthrough can result in an adhesive residue build-up on the ultrasonic bonding equipment and other equipment used in the manufacturing process. Such an adhesive build-up can result in the need for frequent cleaning of the machinery, which increases costs as numerous contaminants can adhere to, and build up on, the adhesive. Additionally, the adhesive build-up on the machinery can result in the adhesive composition being deposited on absorbent products in unintended areas.

Additionally, conventional hot melt adhesive compositions exhibit viscous flow behavior with much lower softening points. These characteristics may result in the creation of a heat sink during ultrasonic bonding. When a heat sink is created, a high percentage of the ultrasonic energy of the system is used for re-melting the adhesive in the bonded area, which leads to bleedthrough under pressure and heat. As such, less ultrasonic energy remains to melt the thermoplastic materials and perform the ultrasonic bond between the materials. The re-melting of the adhesive is not an optimal use of ultrasonic energy as an adhesively bonded joint is typically not as strong as an ultrasonically bonded joint as the bond strength is limited to the cohesive strength of the adhesive. Also, cohesive strength may vary significantly with temperature and, in the case of absorbent care products, body heat may be sufficient to weaken the strength of the adhesive bond to the point of failure.

Based on the foregoing, there is a need for a hot melt adhesive composition that can be utilized as an adhesive between dissimilar or non-ultrasonically bondable materials that will result in an improved ultrasonic bond between the materials. It would also be beneficial if the hot melt adhesive did not result in significant bleedthrough onto the product and did not significantly foul the machinery utilized in the manufacturing process.

SUMMARY OF THE INVENTION

The present invention is directed to disposable absorbent products comprising ultrasonically bonded laminated structures comprising dissimilar or non-bondable materials. The laminated structures generally comprise a first material, a second material, and an adhesive composition located on at least one of the first material or the second materials to assist in the ultrasonic bonding of the materials. The first and second materials are either dissimilar materials or non-bondable materials. The adhesive composition comprises selected ratios of crystalline and amorphous polymers. When such an adhesive composition is used in the laminated structures, strong ultrasonic bonds can be easily and effectively made between the two dissimilar or non-bondable materials without adverse affects generally associated with the use of conventional adhesive compositions.

The present invention also includes an ultrasonically bonded laminated product comprising a first material, a second material, and an adhesive composition wherein the first and second materials are dissimilar or non-bondable. The adhesive composition, which comprises selected ratios of amorphous and crystalline polymeric materials, is introduced onto one or both of the materials to increase the material basis weight of the material such that it is better suited for ultrasonic bonding, and less likely to fail during the ultrasonic bonding process.

Therefore, the present invention is directed to an article comprising an ultrasonically bonded laminated structure. The laminated structure comprises a first material, a second material, and an adhesive composition. The adhesive composition comprises an atactic polymer and an isotactic polymer wherein the atactic polymer has a degree of crystallinity of less than about 20% and a number-average molecular weight of from about 1,000 to about 300,000 and the isotactic polymer has a degree of crystallinity of at least about 40% and a number-average molecular weight of from about 3,000 to about 200,000. The first material and the second material are dissimilar or non-bondable materials and are ultrasonically bonded together.

The present invention is further directed to a process for manufacturing an article comprising an ultrasonically bonded laminated structure. The process comprises providing a first substrate comprising an adhesive composition and a second substrate, which is dissimilar or non-bondable to the first substrate. The adhesive composition comprises an atactic polymer and an isotactic polymer. The atactic polymer has a degree of crystallinity of less than about 20% and a number-average molecular weight of from about 1,000 to about 300,000, and the isotactic polymer has a degree of crystallinity of at least about 40% and a number-average molecular weight of from about 3,000 to about 200,000. The first and second substrate are ultrasonically bonded.

The present invention is further directed to a process for manufacturing an article comprising an ultrasonically bonded laminated structure. The process comprises providing a first substrate and a second substrate, which is dissimilar or non-bondable with the first substrate. An adhesive composition is introduced onto the first or second substrate and the first and second substrate contacted together to form an adhesive bond therebetween. The adhesive composition comprises an atactic polymer and an isotactic polymer. The atactic polymer has a degree of crystallinity of less than about 20% and a number-average molecular weight of from about 1,000 to about 300,000 and the isotactic polymer has a degree of crystallinity of at least about 40% and a number-average molecular weight of from about 3,000 to about 200,000. The first and second substrate are ultrasonically bonded together.

DETAILED DESCRIPTION OF THE PRESENTLY PREFERRED EMBODIMENTS

The present invention is generally directed to disposable products, such as disposable absorbent products, comprising a laminated structure. The laminated structure comprises a first material, a second material, and an adhesive composition wherein the first material and the second material are dissimilar or non-bondable materials. The first and second materials are ultrasonically bonded together. The adhesive composition comprises selected ratios of crystalline and amorphous polymers to improve the performance of the adhesive in the ultrasonic bonding process. For example, the present invention encompasses adhesive compositions comprising selected amounts of polymers having different configurations (e.g., a combination of atactic polypropylene and isotactic polypropylene).

As noted above, the laminated structures of the present invention, which comprise a first material, a second material, and an adhesive composition, comprise an ultrasonic bond between the first material and the second material. Although discussed primarily herein in regards to a first material and a second material, it should be understood that the absorbent products comprising laminated structures described herein may comprise multiple materials ultrasonically bonded together in one or more areas. For example, a laminated structure may comprise three separate layers ultrasonically bonded together.

Ultrasonic bonding is a conventional process wherein materials, and specifically thermoplastic materials, are exposed to a high-frequency vibration which results in a heating, melting, and flowing of the materials to form a mechanical and/or chemical bond. The process is referred to as an "ultrasonic" process because the frequencies of the vibrations utilized are generally above what is considered the upper limit of human hearing (greater than about 18 kilohertz). A typical ultrasonic system utilized for the ultrasonic bonding of thermoplastic or other materials includes an ultrasonic power supply, the ultrasonic stack, which consists of a converter, a combination of waveguides and a terminating waveguide typically referred to as a sonotrode or horn, an actuator, and an anvil.

The high frequency vibration is typically created through the application of a piezoelectric converter and an appropriate power supply. Piezoelectric materials exhibit a property such that when a voltage is applied to them, they change dimensions. In ultrasonic bonding, a power supply applies an alternating voltage at an ultrasonic frequency to the piezoelectric converter. The converter generates a continuous mechanical vibration referred to as a longitudinal compression wave. This compression wave is transmitted from the converter down the ultrasonic stack through one or more waveguides, which are designed to efficiently transmit a vibration of a given frequency. These waveguides may also function to amplify the vibration wave that is output from the converter to achieve a level more desirable for the bonding process.

At this point, the vibration is coupled into the final component of the stack, the horn. The horn is a type of waveguide designed to be the working tool of the ultrasonic system and is where the vibrational energy is applied to the materials being bonded. Because it is also a waveguide, it is designed to efficiently transmit a vibration of a given frequency and may, in some circumstances, further amplify the vibration wave.

The ultrasonic stack is typically mounted into an actuator mechanism, which has three functions: (1) it mounts the ultrasonic stack in a manner that does not constrain the vibration of the components; (2) it actuates the system to bring the vibrating horn into working contact with the anvil; and (3) it applies a static force. The anvil is designed to be a rigid surface for the ultrasonic horn to work against. The materials to be bonded are placed between the horn and the anvil. The horn is actuated so as to apply a static force on the materials.

The horn may be set to actuate to a fixed stop which creates a small gap (typically smaller than the thickness of the materials) between the horn and the anvil or directly loaded against the anvil. In either case, a static force is developed on the materials.

When the ultrasonic system is engaged, the vibration produced at the horn surface creates an alternating compression and relaxation of the materials to be bonded. The alternating high-frequency stress field created in the materials is, to varying degrees, (1) dissipated as heat in the materials (through hysteretic/viscous damping losses); (2) stored in the material as elastic energy which is recoverable by the horn; and/or (3) absorbed and dissipated as heat and vibration in the anvil (typically insignificant). A bond is produced when the heat that is dissipated in the materials reaches the melt temperature of one or more of the materials and they flow together under the static force provided by the actuator to produce a mechanical and/or chemical bond.

With conventional ultrasonic bonding processes, it is highly desired that the materials being ultrasonically bonded together have a common chemical structure such that the melting points of the materials are identical, or nearly identical (e.g., typically a difference of no more than about 40° F.). If the materials are dissimilar or non-bondable, ultrasonic bonding of the materials is typically not successful as the material with the lower melting point will soften and dissipate from the bonding zone before the material with the higher temperature softens and flows.

In accordance with the present invention, the ultrasonically bonded laminated absorbent product comprises a first material and a second material along with an adhesive composition. Either the first and/or second material can be a thermoplastic material or a non-thermoplastic material, such as a cellulosic product, including tissue products and cotton. As used herein, the term "thermoplastic" is meant to include polymeric materials which can be re-heated and re-melted several times without significant material degradation. Suitable thermoplastic materials include those which are predominantly amorphous; that is, materials which are comprised of a mostly random molecular structure and have a broad softening/melting temperature range. Suitable thermoplastic materials also include those which are predominantly crystalline; that is, materials which are comprised of a mostly ordered molecular structure and a very well-defined melting point. Some thermoplastic materials that are commonly utilized in forming laminated absorbent products include, for example, polypropylene, polyethylene, polyester, Kraton® polymers, natural rubber, polyurethane, polylactic acid, nylon, and polystyrene. As used herein, rubber is meant to include, for example, thermal elastomers such as SIS, SBS, SEPS, SEBS, EPDM, and polyurethane. It will be recognized by one skilled in the art based on the disclosure herein that thermoplastic materials may be combined to form various products such as, for example, spunbond materials, woven materials, stretch bonded laminates, neck bonded laminates, spunbond meltblown spunbond materials, and non-woven materials, which are also included within the scope of the present invention.

As noted herein, the first material and second material are dissimilar or non-bondable materials. As used herein, the term "dissimilar" means that the materials have melting temperatures that vary by more than about 40° F., and have dissimilar molecular structures such that upon ultrasonic bonding, the materials are not brought together as one material and typically have macro-phase separation. Although it may be possible to form an ultrasonic bond between two dissimilar materials using conventional processes and conventional hot-melt adhesives, the resulting bond is typically very weak and unstable.

As noted above, the first and second materials may be non-bondable materials. As used herein, the term "non-bondable" means that the materials are not substantially capable of being ultrasonically bonded because one or both of the materials is a non-thermoplastic material which will not melt during ultrasonic bonding. Because there is no melting and flowing of the materials, an ultrasonic bond cannot form. One specific example includes a first material of tissue paper and a second material of tissue paper. Because both of these materials are non-thermoplastic materials and do not melt and flow, ultrasonic bonding of these materials is very difficult, if not impossible. Some other non-bondable materials include, for example, paper, cellulosic materials, some woven fabrics and cotton. Specific examples of a first material and a second material which are dissimilar or non-bondable which can be ultrasonically bonded utilizing the adhesive composition described herein include, for example, (1) neck-bonded laminates to pattern unbonded materials; (2) tissue to tissue; (3) spunbond meltblown spunbond to woven polyester knit; and (4) pulp fibers sandwiched between polypropylene substrates.

In ultrasonic bonding, the alternating compression and relaxation described above that is imposed upon the materials by the ultrasonic vibration acts upon the materials' molecular structure. Amorphous materials convert much of the vibrational energy into heat through hysteretic/viscous damping losses. Crystalline materials tend to store a larger percentage of the ultrasonic vibration as elastic energy and return it to the horn. Although both amorphous and crystalline thermoplastics can be ultrasonically heated and melted, amorphous materials are more easily heated with vibrational energy. As mentioned above, non-thermoplastic materials are typically very difficult or impossible to ultrasonically bond.

In one embodiment of the present invention, two dissimilar materials are ultrasonically bonded utilizing the adhesive composition described herein. At least one surface of at least one of the dissimilar materials is coated with the adhesive composition prior to the ultrasonic bonding. In some embodiments, both surfaces of one or both materials are coated with the adhesive composition prior to the ultrasonic bonding process. For example, if the first dissimilar material is polypropylene and the second dissimilar material is polyethylene, the polypropylene may be coated on both sides prior to contacting the polyethylene and the starting of the ultrasonic bonding process. Once ultrasonic bonding begins, the hot melt adhesive present melts and flows into one or both of the dissimilar materials where it ultimately hardens forming an ultrasonic bond. In a specific embodiment, the adhesive composition may comprise both polypropylene and polyethylene polymers such that upon melting during the ultrasonic bonding process, the adhesive composition can melt and flow into both dissimilar materials and harden to form both mechanical and chemical-type ultrasonic bonds.

In another embodiment of the present invention, two non-bondable materials are ultrasonically bonded using the adhesive composition described herein. At least one surface of at least one of the non-bondable materials is coated with the adhesive composition prior to the ultrasonic bonding. In some embodiments, both surfaces of one or both non-bondable materials is coated with the adhesive composition prior to the ultrasonic bonding process. For example, if the first non-bondable material is tissue paper and the second non-bondable material is tissue paper, the first tissue paper may be coated on both sides prior to contacting the second tissue paper material and the starting of the ultrasonic bonding process. Once ultrasonic bonding begins, the hot melt adhesive present melts and flows into one or both of the non-bondable materials where it ultimately hardens forming an ultrasonic bond.

With ultrasonically bonded materials that are dissimilar or non-bondable, it is believed that the actual ultrasonic bonding is not of these materials themselves, but is instead of the adhesive composition described herein to both of the materials in the bonding zone where the adhesive composition is located. The ultrasonic energy present in the system melts the adhesive composition present in the bond zone to the materials being bonded together, and allows the molten adhesive composition to flow and form a bond or weld of the materials to which it contacts. As such, the adhesive composition can melt and flow into the fibrous matrix of the material where it hardens to form a strong bond.

One significant advantage of the adhesive composition described herein for use as an aid to ultrasonic bonding of dissimilar or non-bondable materials is that the adhesive can be formulated as described herein to have a very short cure rate such that it is substantially non-tacky very shortly after application to one or both materials. This is advantageous as the adhesive composition can be applied to the materials further upstream in the manufacturing process as compared to conventional hot melt adhesives without risk of other components of the product being produced sticking to the adhesive and altering the final product. Additionally, if desired, the adhesive composition can be applied to one or both materials to be ultrasonically bonded offline; that is, in a location off of the manufacturing line such that the materials, when introduced into the manufacturing line, are already treated with the adhesive composition such that they are ready for ultrasonic bonding.

Another advantage of the adhesive compositions described herein for use as an aid to ultrasonic bonding of the dissimilar or non-bondable materials is that the adhesive will not cause substantial build-up on the equipment used to perform the ultrasonic bonds; that is, because the adhesive compositions as described herein do not significantly bleed through the materials being ultrasonically bonded, they do not contact or contaminate the ultrasonic bonding or other equipment and, as such, build-up is significantly minimized or eliminated.

A further advantage of the adhesive compositions described herein for use as an aid to ultrasonic bonding of the dissimilar or non-bondable materials is that the effect of overspray of the adhesive composition on the product during manufacturing of the laminated absorbent product is not significantly problematic. Because the open time of the adhesive compositions as described herein can be easily controlled and made very short, any overspray onto other components of the absorbent products does not remain tacky or sticky for an extended period of time. As such, the probability of the overspray interfering with other components and negatively affecting the manufacturing process is substantially minimized or eliminated.

As noted herein, the adhesive composition for use in combination with the dissimilar or non-bondable first material and second material, which are ultrasonically bonded together, comprises an atactic, or amorphous, polymer and an isotactic polymer. An atactic polymer is generally less likely to assume a crystalline structure, while an isotactic polymer is generally more likely to assume a crystalline structure. Without being bound to any particular theory, it is believed that an adhesive composition comprising a specified combination of atactic and isotactic polymers, such as atactic and isotactic polypropylene, possesses regions, and/or characteristics, of both a crystalline material and an amorphous material. By changing the relative amounts of atactic and isotactic polymer, or for that matter the relative amounts of polymer having differing degrees of crystallinity, one can change the performance characteristics of the resulting adhesive composition. The adhesive compositions as described herein generally perform better, and cost less, than conventional hot-melt adhesives in ultrasonic bonding processes. It should be understood, however, that the present invention encompasses adhesive compositions comprising selected polymers having different degrees of crystallinity, such as an adhesive composition comprising atactic and isotactic polypropylene, whether or not the composition possesses all of the advantages discussed herein.

The adhesive compositions described herein for use with the materials as discussed herein to be ultrasonically bonded may be utilized in conventional hot-melt adhesive processing equipment without modification. As such, the adhesive compositions described herein may be used in existing equipment installed for the purpose of processing and applying conventional hot-melt adhesives in the manufacturing process. Furthermore, the adhesive compositions described herein can be applied during the manufacturing process in-line for immediate use, or may be applied to one or more materials off-line, at a distant location, and then shipped to the manufacturing process line for use at a later date.

Additionally, it should be understood that the atactic and isotactic polymers comprising the adhesive compositions described herein could be heated and blended at a site other than the site wherein the laminated absorbent product is being manufactured. For example, atactic and isotactic polymers could be blended using an extruder or hot-melt processing equipment at a first geographic location. The blended polymers could then be allowed to cool and processed to make a solid form such as, for example, pellets. The polymer blend could then be shipped from the first geographic site to a site where the laminated products are made. The polymer blend would simply be heated to substantially liquefy the adhesive composition prior to its being used to make a laminated product.

The adhesive compositions described herein can be blended in numerous ways in accordance with the present invention. For example, the atactic polymer could be heated in a first container and the isotactic polymer could be heated in a second container before, after, or concurrently with the heating of the atactic polymer and then the two liquefied polymers mixed together in the first container, the second container, or a third container. Alternatively, one of either the atactic or isotactic polymers could be heated in a container until liquefied, at which time the second polymer could be added to the first liquefied polymer and melted. Additionally, both solid polymers could be added to a single container and melted simultaneously to produce a hot melt adhesive. Based on the disclosure herein, one skilled in the art will recognize that the other additional components as discussed herein may also be added to the adhesive compositions. It is noted that the above discussion assumes that the atactic and isotactic polymers are in substantially solid form at room temperature, or at temperatures that are typically present in a working environment suitable for human beings. To the extent that either or both of the polymers are available in substantially liquid form, then those steps providing for heating and melting the polymer can be omitted from the methods of making the adhesive composition.

In accordance with the present invention, the adhesive composition is formulated to be semi-crystalline, which brings its melting temperature into a range similar to many thermoplastic materials, which may be ultrasonically bonded. The adhesive composition described herein does not act as a substantial heat sink in the bond zone and thus, leaves substantial vibrational energy to perform the ultrasonic bond via melting the materials as described above. Additionally, the adhesive compositions described herein improve the chemical compatibility with many of the thermoplastic materials of interest for ultrasonic bonding.

Along with the benefits outlined above, the adhesive compositions described herein do not have the propensity to flow onto the processing equipment and adversely affect the equipment like traditional hot melt adhesives. Also, for thermoplastic materials that are not significantly affected by ultrasonic vibrational energy, the hot melt adhesive described herein makes a highly efficient bonding agent by providing an interface in the bond zone that can be affected by ultrasonic energy.

The adhesive composition useful for use in combination with a first material and a second material, that are dissimilar or non-bondable materials and which are ultrasonically bonded together, comprises an atactic polymer and an isotactic polymer. As used herein, the term isotactic polymer, which includes syndiotactic polymers, refers to a polymer that is at least about 60% isotactic, and suitably at least about 70% isotactic, and more suitably at least about 80% isotactic. As used herein, the term atactic polymer refers to a polymer that is at least about 80% atactic, suitably at least about 90% atactic.

The atactic polymer comprises from about 40% (by weight) to about 90% (by weight) of the adhesive composition and has a degree of crystallinity of about 20% or less, suitably a crystallinity of about 15% or less, and a number average molecular weight of from about 1,000 to about 300,000, suitably from about 3,000 to about 100,000. The isotactic polymer comprises from about 5% (by weight) to about 30% (by weight) of the adhesive composition and has a degree of crystallinity of about 40% or more, suitably about 60% or more, and more suitably about 80% or more, and a number-average molecular weight of from about 3,000 to about 200,000, suitably from about 10,000 to about 100,000.

The adhesive composition is hot melt processable at a temperature of about 450 degrees Fahrenheit or less, suitably 400 degrees Fahrenheit or less, suitably 375 degrees Fahrenheit or less, and still more suitably about 350 degrees Fahrenheit or less. Further, the adhesive composition has a melt index of from about 100 to about 2000 grams per 10 minutes, suitably from about 200 to about 1800 grams per 10 minutes, suitably from about 500 to about 1500 grams per 10 minutes as determined by ASTM D 1238. The melt index is dependent upon the crystallinity, molecular weight, and the molecular weight distribution of the polymers included in the adhesive composition.

The atactic polymer may be the same polymer as the isotactic polymer, or it may be a different polymer than the isotactic polymer. Suitable polymeric materials for preparing the adhesive composition include, for example, polypropylene, polybutene, polyethylene, and combinations thereof. In one embodiment high density polyethylene (HDPE), which is more crystalline, and low density polyethylene (LDPE), which is less crystalline, may be used as the polymers. HDPE generally has a density in the range of from about 0.935 to about 0.980 grams per cubic centimeter, while LDPE generally has a density in the range of from about 0.910 to about 0.935 grams per cubic centimeter.

As used herein, weight percent means the mass of one type of polymer (e.g., atactic) in the adhesive composition divided by the sum of the masses of the other types of polymer(s) (e.g., atactic and isotactic) in the adhesive composition, plus the mass of any additional components that might be present in the adhesive composition, with this value being multiplied by 100. For example, if the adhesive composition comprises 40 grams of atactic polypropylene with 60 grams of isotactic polypropylene, the combination includes 40 weight percent atactic polypropylene.

In addition to the atactic and isotactic polymeric components in the adhesive composition described herein, the composition may additionally comprise up to about 50% (by weight) of a combination of additives such as a tackifier, an antioxidant, viscosity modifiers, color pigments, fillers, and/or a polymeric compatibilizer. Examples of suitable tackifiers include PICCOLYTE S Resins, REGALITE series, and STAYBELITE esters, each available from Hercules Incorporated, Wilmington, Del. The adhesive composition may suitably include from about 10% (by weight) to about 20% (by weight) tackifier. Examples of suitable antioxidants include IRGANOX® 565, available from Ciba-Geigy, POLYGARD®, available from Uniroyal Chemical Co., and ANTIOXIDANT® series, available from Cytec Industries. The adhesive composition may suitably include from about 0.1% (by weight) to about 1.0% (by weight) antioxidant. Examples of suitable color pigments and fillers include titanium dioxide, carbon black, and calcium carbonate. The adhesive composition may suitably include from about 1% (by weight) to about 10% (by weight) color pigments and fillers. Examples of suitable polymer compatibilizers include polypropylene-b-polyethylene, and polypropylene-b-polybutene diblock copolymers, SIS, SEPS, and multiblock copolymers. The adhesive composition may suitably include from about 2% (by weight) to about 10% (by weight) polymer compatibilizer.

The adhesive compositions described herein suitably have an open time of up to about 2 minutes and suitably less than 10 minutes when applied to a substrate such as a thermoplastic material. Alternatively, the adhesive composition can have an open time of up to about 30 seconds, or up to about 10 seconds, or as short as up to about 1 second depending upon the desired application. As used herein, the term "open time" refers to the length of time during which an adhesive composition remains tacky or sticky on the substrate surface prior to solidifying. Open time is affected by the crystallinity of a polymer, such that the greater the level of crystallinity, the shorter the open time. Desirably, the adhesive compositions described herein have open times typically much shorter than conventional hot melt adhesives.

Ultrasonic bonds between two materials that comprise an adhesive compound therebetween are utilized in numerous areas during the construction of a laminated disposable absorbent product. Because ultrasonic bonds typically have improved strength and reliability as compared to adhesive-type bonds, they are typically favored during construction of the absorbent product in various areas. The adhesive composition described herein can be utilized in numerous areas of a laminated disposable product where ultrasonic bonding is performed to increase strength. For example, the adhesive composition may be present between the ear attachment (which may be, for example, a neck-bonded laminate) and the chassis. Typically, an adhesive is used in this area to stabilize the ear assembly in the desired area of the product during manufacturing as the product travels along the manufacturing lines at a high rate of speed. Additionally, the adhesive composition may be utilized between hook material and the base to which the hook material is attached, which is typically a polymer material.

Further, the adhesive composition can be used in the following areas where ultrasonic bonding is desired to increase strength: (1) liner material attachment to the chassis; (2) in the containment flap assembly; (3) on the absorbent wrap sheet; (4) neck-bonded laminates to pattern unbonded materials; (5) liners to baffles; (6) liners to absorbent structures; (7) neck-bonded laminates to neck-bonded laminates; and (8) stretch bonded laminates to side panels. Based on the disclosure herein, one skilled in the art will recognize that there may be numerous other areas where the adhesive composition could be utilized prior to the formation of ultrasonic bonds.

The adhesive compositions described herein can be used in the manufacturing process of laminated disposable absorbent products in multiple areas where an adhesive is required and where ultrasonic bonding will take place between two materials. Conventional hot melt adhesives, when located in the ultrasonic bonding area, simply melt and flow into one or both of the materials being bonded together upon the application of vibrational energy to produce only an adhesive bond which is susceptible to failure upon use. Because conventional hot melt adhesives have different melt and flow characteristics as compared to many thermoplastic materials, the thermoplastic materials do not melt and, as such, do not flow together in the ultrasonic bonding process to form a strong, stable ultrasonic bond. In contrast, the hot melt adhesives described herein have melting characteristics similar to the thermoplastic materials being ultrasonically bonded such that, upon application of the vibrational energy utilized in the ultrasonic bonding process, both thermoplastic materials may melt along with the adhesive composition and flow together to form a strong, reliable ultrasonic bond without a significant risk of bleedthrough or failure.

In another embodiment of the present invention, the adhesive composition described herein for use with ultrasonic bonds can be utilized to reinforce or thicken a material in an ultrasonic bonding zone. Typically, it is very difficult to obtain a high strength ultrasonic bond of many materials, such as thermoplastic materials that have a low basis weight (thin thermoplastic materials that have a small amount of polymer mass) as the materials tend to tear or disintegrate during the ultrasonic bonding process, which results in a low amount of heat production. The adhesive compositions described herein can be utilized as material basis weight increasing agents to increase the material basis weight and improve the overall strength and durability of one or more components of a disposable laminated absorbent garment subjected to ultrasonic bonding without deteriorating the resulting bond; that is, the adhesive compositions may be used to increase the material basis weight of one or more specific thermoplastic components or other components (e.g., tissue components) of a laminated product to provide increased material strength of the resulting product as opposed to using a thicker starting material. As such, the adhesive compositions described herein can also serve a dual function of acting as a bonding agent and a material basis weight increasing agent without negatively affecting ultrasonic bonding.

As is evident from the above discussion and known to those skilled in the art, it is typically desirable to utilize thin thermoplastic materials as components when manufacturing disposable laminated absorbent products such that a thin disposable product is produced; that is, it is typically desirable to use thermoplastic materials with small basis weights, generally from about 0.2 osy to about 0.8 osy, and desirably from about 0.2 osy to about 0.6 osy. The reasons for this are severalfold, with the primary reason being cost considerations. When thinner thermoplastic materials are utilized to construct laminated absorbent products, significant cost savings on raw materials can be realized. Additionally, thinner materials generally result in improved flexibility of the resulting product, and improved fit on the wearer. This improved flexibility and fit can result in a more comfortable product with a reduced risk of leaking, and hence a more consumer-friendly product.

Along with cost and flexibility, thinner materials also typically allow for improved breathability of the resulting product. Products with a high degree of breathability are desirable as hot, moist air contained within the product after soiling of the product can be exchanged with the air outside of the product allowing fresh, cool air inside of the product. This results in a more comfortable product for the wearer, and may also improve overall skin health of the wearer by reducing skin over-hydration. Additionally, thinner materials will typically allow leg and waist elastics to perform better such that leakage from the product is minimized. This occurs due to the fact that with thinner materials, the elastic portions of the leg and waist bands do not have to move as much material and perform more efficiently.

Moreover, thinner materials allow for improved packaging as the resulting package containing the product is thinner, and easier to handle and cheaper to transport. This is a direct result of an improvement in the folding and bending characteristics of the absorbent products when thinner materials are used to construct the product. Also, thinner packages have significant consumer appeal as they are easier to transport and do not look as bulky as conventionally packaged absorbent products.

Although it is generally desirable to utilize thin materials during manufacture of laminated disposable absorbent products as discussed above, such thin materials can lead to numerous problems during the ultrasonic bonding of such materials. An ultrasonic bond may cause material failure during manufacturing due to the hammer/anvil combination pushing through or puncturing the material causing it to tear, fracture, and/or shred such that the bond fails and the product is not useable. Also, in some cases the materials may overheat and melt too much resulting in a burn through of the material. This is typically a direct result of the material being too thin to allow for the formation of the bond. Similar problems can arise with the other types of bonds and fasteners. Also, as mentioned above, bleedthrough can also be an issue.

In accordance with one embodiment of the present invention, the adhesive compositions described herein can be utilized on a specific thermoplastic component or other component of a disposable laminated absorbent product to increase the material basis weight, and hence the strength, of the treated component such that is it much less likely to fail during manufacture when bonding is performed in the area containing the adhesive composition, or during consumer use. In this embodiment, the adhesive composition is selectively added to a specific region of a component, or the entire component, to increase the material basis weight of that region such that the strength and durability are improved and the component is more resistant to the stress and shear forces imparted thereon during manufacture and ultrasonic bonding. The adhesive composition utilized to increase the material basis weight and the strength of the component may be applied in-line, that is during the manufacturing process, or may be applied off-line in a separate process prior to the introduction of the treated component into the manufacturing process. The adhesive compositions of the present invention act to increase the strength of the treated area by allowing a distribution of force along the entire treated area such that the strength of the area is increased. This embodiment of the present invention allows for an increase in material strength where needed to improve product performance without the need to use a thicker starting material which could significantly increase costs, and also allows for a quality ultrasonic bond to be made between materials.

The adhesive compositions described herein can be applied to the dissimilar or non-bondable materials by conventional hot melt adhesive equipment as noted above. During application of the adhesive composition to the materials, the adhesive composition can be applied in any pattern or configuration suitable to attain the desired objective. Specifically, the adhesive composition can be applied in a bead configuration, a swirl configuration, or it can be slot coated or melt blown onto the materials.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. An article comprising an ultrasonically bonded laminated structure, the laminated structure comprising a first material, a second material, and an adhesive composition, the adhesive composition comprising an atactic polymer and an isotactic polymer, the atactic polymer having a degree of crystallinity of less than about 20% and a number-average molecular weight of from about 1,000 to about 300,000 and the isotactic polymer having a degree of crystallinity of at least about 40% and a number-average molecular weight of from about 3,000 to about 200,000, wherein the first material and the second material are dissimilar materials and are ultrasonically bonded together.

2. The article as set forth in claim 1 wherein the degree of crystallinity of the atactic polymer is less than about 15%.

3. The article as set forth in claim 1 wherein the degree of crystallinity of the isotactic polymer is at least about 60%.

4. The article as set forth in claim 1 wherein the number-average molecular weight of the atactic polymer is between about 3,000 and about 100,000.

5. The article as set forth in claim 1 wherein the number-average molecular weight of the isotactic polymer is between about 10,000 and about 100,000.

6. The article as set forth in claim 1 wherein the adhesive composition is hot-melt processable at less than about 400 degrees Fahrenheit.

7. The article as set forth in claim 1 wherein the adhesive composition is hot-melt processable at less than about 375 degrees Fahrenheit.

8. The article as set forth in claim 1 wherein the adhesive composition has a melt index of from about 100 to about 2000 grams per 10 minutes.

9. The article as set forth in claim 1 wherein the adhesive composition comprises from about 40 to about 90 weight percent of the atactic polymer and from about 5 to about 30 weight percent of the isotactic polymer.

10. The article as set forth in claim 1 wherein the atactic polymer comprises atactic polypropylene.

11. The article as set forth in claim 1 wherein the isotactic polymer comprises isotactic polypropylene.

12. The article as set forth in claim 1 wherein the first material comprises polyethylene and the second material comprises polypropylene.

13. The article as set forth in claim 1 wherein the adhesive composition additionally comprises a further component selected from the group consisting of tackifiers, antioxidants, color pigments, viscosity modifiers, fillers, and polymeric compatibilizers.

14. An article comprising an ultrasonically bonded laminated structure, the laminated structure comprising a first material, a second material, and an adhesive composition, the adhesive composition comprising an atactic polymer and an isotactic polymer, the atactic polymer having a degree of crystallinity of less than about 20% and a number-average molecular weight of from about 1,000 to about 300,000 and the isotactic polymer having a degree of crystallinity of at least about 40% and a number-average molecular weight of from about 3,000 to about 200,000, wherein the first material and the second material are dissimilar materials and are ultrasonically bonded together, and wherein the adhesive composition has an open time of less than about 10 minutes.

15. The article as set forth in claim 14 wherein the degree of crystallinity of the atactic polymer is less than about 15%.

16. The article as set forth in claim 14 wherein the degree of crystallinity of the isotactic polymer is at least about 60%.

17. The article as set forth in claim 14 wherein the number-average molecular weight of the atactic polymer is between about 3,000 and about 100,000.

18. The article as set forth in claim 14 wherein the number-average molecular weight of the isotactic polymer is between about 10,000 and about 100,000.

19. The article as set forth in claim 14 wherein the adhesive composition is hot-melt processable at less than about 400 degrees Fahrenheit.

20. The article as set forth in claim 14 wherein the adhesive composition is hot-melt processable at less than about 375 degrees Fahrenheit.

21. The article as set forth in claim 14 wherein the adhesive composition has a melt index of from about 100 to about 2000 grams per 10 minutes.

22. The article as set forth in claim 14 wherein the adhesive composition comprises from about 40 to about 90 weight percent of the atactic polymer and from about 5 to about 30 weight percent of the isotactic polymer.

23. The article as set forth in claim 14 wherein the atactic polymer comprises atactic polypropylene.

24. The article as set forth in claim 14 wherein the isotactic polymer comprises isotactic polypropylene.

25. The article as set forth in claim 14 wherein the first material comprises polyethylene and the second material comprises polypropylene.

26. The article as set forth in claim 14 wherein the adhesive composition additionally comprises a further component selected from the group consisting of tackifiers, antioxidants, viscosity modifiers, color pigments, fillers, and polymeric compatibilizers.

* * * * *